(12) United States Patent
Adams et al.

(10) Patent No.: US 12,341,831 B2
(45) Date of Patent: Jun. 24, 2025

(54) WEBINAR WATCH-PARTY

(71) Applicant: Zoom Video Communications, Inc., San Jose, CA (US)

(72) Inventors: Kathleen Lucille Adams, Overland Park, KS (US); Annika Elias, Seattle, WA (US); Pankaj Kumar Prasad, San Francisco, CA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 17/589,227

(22) Filed: Jan. 31, 2022

(65) Prior Publication Data

US 2023/0247067 A1  Aug. 3, 2023

(51) Int. Cl.
*H04L 65/401* (2022.01)
*H04L 65/1093* (2022.01)
*H04L 65/403* (2022.01)

(52) U.S. Cl.
CPC ...... *H04L 65/4015* (2013.01); *H04L 65/1093* (2013.01); *H04L 65/403* (2013.01)

(58) Field of Classification Search
None
See application file for complete search history.

(56) References Cited

U.S. PATENT DOCUMENTS

| 7,127,487 | B1 | 10/2006 | Wang |
| 7,716,284 | B2 * | 5/2010 | Andersen ............... G06Q 10/10 709/200 |
| 8,234,336 | B2 * | 7/2012 | Slater .................. H04L 12/1822 726/8 |
| 8,483,375 | B2 * | 7/2013 | Dhara ................. H04L 12/1818 709/204 |

(Continued)

OTHER PUBLICATIONS

YouTube video clip titled How to use breakout rooms in Microsoft Teams, pp. 1-2, uploaded on Dec. 10, 2020 by user "Microsoft Education" Retrieved from Internet https://www.youtube.com/watch?v=Nq2pbPtMZGk (Year: 2020).*

(Continued)

*Primary Examiner* — Backhean Tiv
(74) *Attorney, Agent, or Firm* — Kilpatrick Townsend & Stockton LLP

(57) ABSTRACT

Systems and methods for providing a webinar watch-party are provided herein. In an example, a system comprising a non-transitory computer-readable medium, a communications interface, and a processor communicatively coupled to the non-transitory computer-readable medium and the communications interface may be provided. The processor may be configured to execute processor-executable instructions stored in the non-transitory computer-readable medium to: receive, from a first client device, webinar access information; identify the first client device based on the webinar access information; transmit, to the first client device, watch-party access information; transmit to the first client (Continued)

device: a first set of audio and video streams corresponding to a webinar main meeting; and a second set of audio and video streams corresponding to a webinar watch-party based on the watch-party access information; and receive, from the first client device, a first audio stream and a first video stream.

20 Claims, 9 Drawing Sheets

(56) References Cited

U.S. PATENT DOCUMENTS

| | | | |
|---|---|---|---|
| 8,804,577 | B1 | 8/2014 | Kondapalli |
| 9,148,627 | B2* | 9/2015 | Anderson ............ H04L 65/4046 |
| 9,325,940 | B2* | 4/2016 | Smelyansky .......... G09B 5/065 |
| 10,284,609 | B2* | 5/2019 | Malatesha ........... H04L 65/4015 |
| 11,153,442 | B1 | 10/2021 | Balyasny |
| 11,196,869 | B2* | 12/2021 | Lee ....................... H04M 3/564 |
| 11,343,293 | B1* | 5/2022 | Slotznick ................ G06F 3/165 |
| 11,489,684 | B2* | 11/2022 | Lin ..................... H04L 12/1822 |
| 11,558,436 | B2* | 1/2023 | Han ....................... H04N 7/157 |
| 11,575,720 | B2* | 2/2023 | Han ..................... H04L 12/1822 |
| 11,601,480 | B1* | 3/2023 | Panchaksharaiah ......................... H04L 65/1086 |
| 11,785,180 | B2* | 10/2023 | Peters ..................... H04N 7/147 348/14.09 |
| 11,949,723 | B1* | 4/2024 | Batt ...................... H04L 65/403 |
| 11,962,857 | B2* | 4/2024 | Sahasi ................. H04N 21/4668 |
| 11,991,225 | B2* | 5/2024 | Han ..................... H04L 12/1822 |
| 2006/0195519 | A1* | 8/2006 | Slater .................. H04L 12/1822 709/204 |
| 2007/0203980 | A1* | 8/2007 | Andersen ............... G06Q 10/10 709/204 |
| 2007/0299710 | A1* | 12/2007 | Haveliwala ............ G06Q 10/10 705/7.19 |
| 2010/0220172 | A1* | 9/2010 | Michaelis ........ H04N 21/44016 348/14.08 |
| 2011/0228922 | A1* | 9/2011 | Dhara ..................... H04L 47/70 379/202.01 |
| 2011/0271212 | A1* | 11/2011 | Jones .................... H04M 3/567 715/753 |
| 2012/0128146 | A1 | 5/2012 | Boss |
| 2013/0195260 | A1* | 8/2013 | Barsoba ................ H04L 65/403 379/88.14 |
| 2014/0267550 | A1* | 9/2014 | Nimri .................... H04N 7/152 348/14.09 |
| 2014/0362165 | A1* | 12/2014 | Ackerman ............. G06Q 10/10 348/14.07 |
| 2017/0070706 | A1* | 3/2017 | Ursin .................. H04L 12/1822 |
| 2017/0279859 | A1 | 9/2017 | Pogorelik |
| 2018/0316893 | A1* | 11/2018 | Rosenberg ............ H04N 7/152 |
| 2018/0337968 | A1* | 11/2018 | Faulkner ............... H04L 51/046 |
| 2020/0382618 | A1* | 12/2020 | Faulkner ............... H04L 65/403 |
| 2021/0258427 | A1* | 8/2021 | Lee ...................... H04L 12/1831 |
| 2021/0352244 | A1 | 11/2021 | Benedetto |
| 2022/0052863 | A1* | 2/2022 | Harrington .......... H03G 3/3005 |
| 2022/0070524 | A1* | 3/2022 | Iyer .................. H04N 21/43076 |
| 2022/0086393 | A1* | 3/2022 | Peters .................... H04N 7/147 |
| 2022/0271962 | A1* | 8/2022 | Patel ...................... G06F 3/167 |
| 2022/0321369 | A1* | 10/2022 | Lin ..................... H04L 12/1822 |
| 2022/0385701 | A1* | 12/2022 | Wang ................. H04L 65/4015 |
| 2022/0408059 | A1 | 12/2022 | Stonehocker |
| 2023/0188792 | A1* | 6/2023 | Sahasi ................ H04N 21/4668 725/46 |
| 2023/0199120 | A1* | 6/2023 | Panchaksharaiah .. H04M 3/564 348/14.08 |
| 2023/0247067 | A1* | 8/2023 | Adams ................ H04L 65/1093 709/204 |

OTHER PUBLICATIONS

U.S. Non-Final Office Action; U.S. Appl. No. 17/589,499; 16 pages; Jun. 15, 2023.

U.S. Non-Final Office Action; U.S. Appl. No. 17/589,499; 13 pages; Oct. 12, 2022.

U.S. Final Office Action; U.S. Appl. No. 17/589,499; 19 Pages; Dec. 1, 2023.

U.S. Final Office Action; U.S. Appl. No. 17/589,499; 17 Pages; Feb. 7, 2023.

* cited by examiner

WEBINAR WATCH-PARTY

FIELD

The present application generally relates to videoconferences and more particularly relates to systems and methods for providing a webinar watch-party during a webinar.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
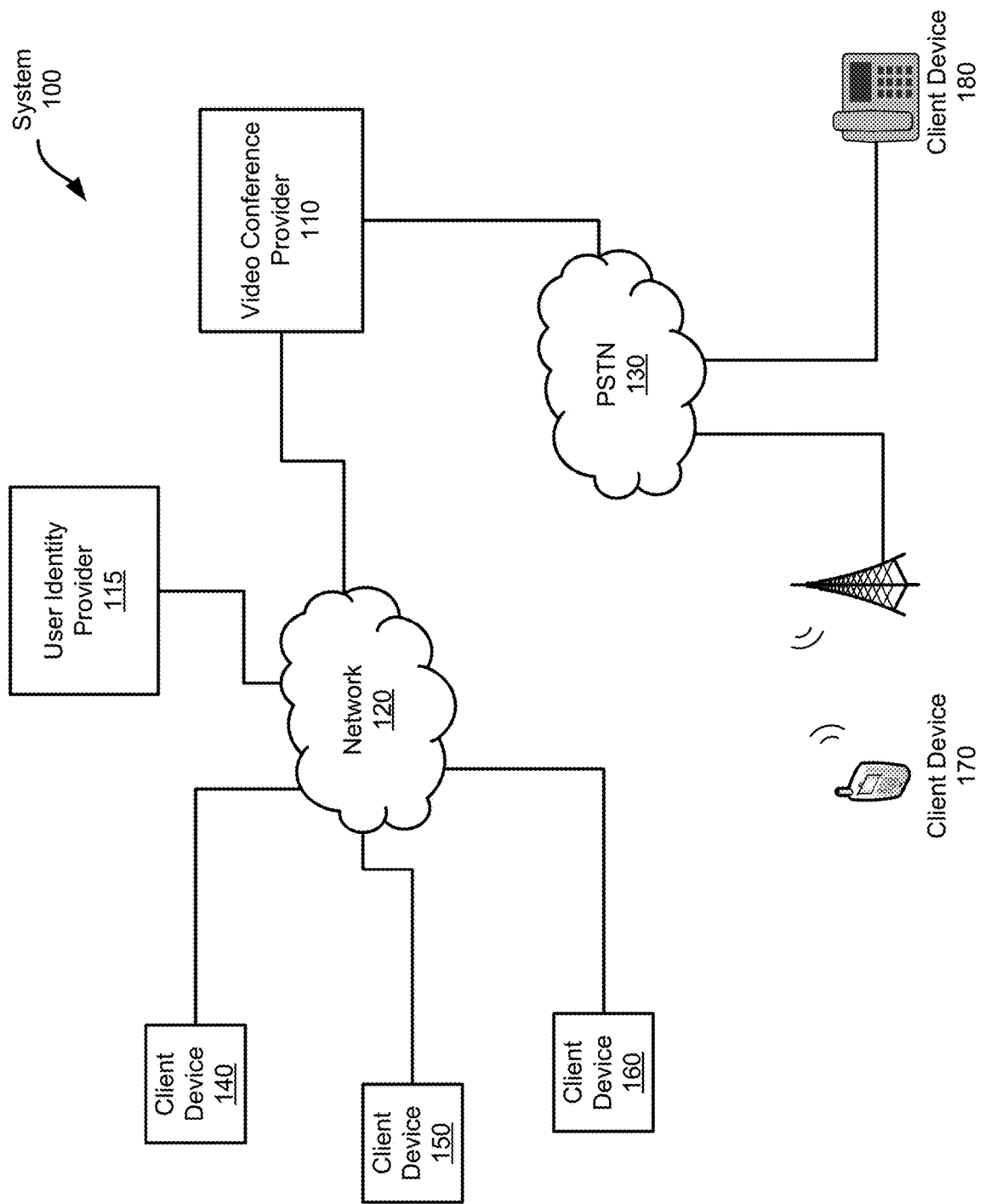
FIG. 1 illustrates an example system that provides videoconferencing functionality to various client devices, according to an embodiment herein.

Examples are described herein in the context of systems and methods for providing webinar watch-parties for virtual meeting rooms associated with a videoconference. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Video conference providers can enable people to interact with each other using their own computers (or "client devices") with both video and audio in a variety of settings, such as in one-on-one conversations, group meetings, and webinars. While each of these types of settings can allow people to interact with each other, they can differ in character. For example, one-on-one conversations include only two people and may involve only a small amount of data being transmitted between the two client devices. Group meetings may involve a larger number of people all interacting with each other. In contrast, webinars typically involve a group of people that are attending to hear presentations from one or more presenters. Thus, in a webinar, interaction tends to be mostly one-way: from the presenter(s) to the audience. In addition, webinars can have very large numbers of participants, potentially numbering in the thousands or tens of thousands. The size and structure of webinars, however, often leave participants feeling isolated because they are unable to interact with other participants during a webinar.

To allow participants to interact with other participants during a webinar, a webinar watch-party may be used. The webinar watch-party provides a virtual space in which participants can interact with each other to make the webinar a more engaging experience. Participants may want to attend a webinar together to discuss the meeting topics without interrupting the main presentation. For example, during a webinar a participant may want to ask another participant a question about the presentation topic or discuss the presentation topic in further detail with the other participant. During a physical meeting, these participants may be able to sit near each other and whisper to each other to communicate without interrupting the meeting. In the virtual space, however, engaging in a side conversation or whispering to a neighbor participant during a meeting is not feasible.

To use a webinar watch-party, a participant may use their client device to create a new watch-party during a webinar and to select one or more other participants to invite into the watch-party. The webinar watch-party may be a separate channel, created by the video conference provider based on the participant's instruction, in which two or more participants can attend a webinar together such that they can communicate with each other without disrupting the main meeting. For example, participants can be assigned to a webinar watch-party together and also attend the webinar together. In the webinar watch-party, the participants in the webinar watch-party ("watch-party participants") can view the video and audio streams from the webinar, but can also exchange audio and video streams with each other without interrupting the main webinar.

In some embodiments, participants interested in the same topic, in the same practice area, or from the same company or department may attend the same webinar watch-party. During the webinar watch-party, the participants may continue to receive the audio and video streams from the main webinar, but also may exchange the audio and video streams from other participants in the webinar watch-party. As such, the watch-party participants are able to discuss the webinar topics without interrupting the main webinar. In other embodiments, the webinar watch-party may allow for networking opportunities that are not typically present in the virtual space. For example, participants may be automatically selected to join a webinar watch-party or may request to join a webinar watch-party based on a topic of interest or a participant list for a webinar watch-party. In this manner, webinar watch-parties allow for webinars to be a more engaging experience for attendees.

This illustrative example is given to introduce the reader to the general subject matter discussed herein and the disclosure is not limited to this example. The following sections describe various additional non-limiting examples and examples of systems and methods for providing a webinar watch-party during a webinar.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
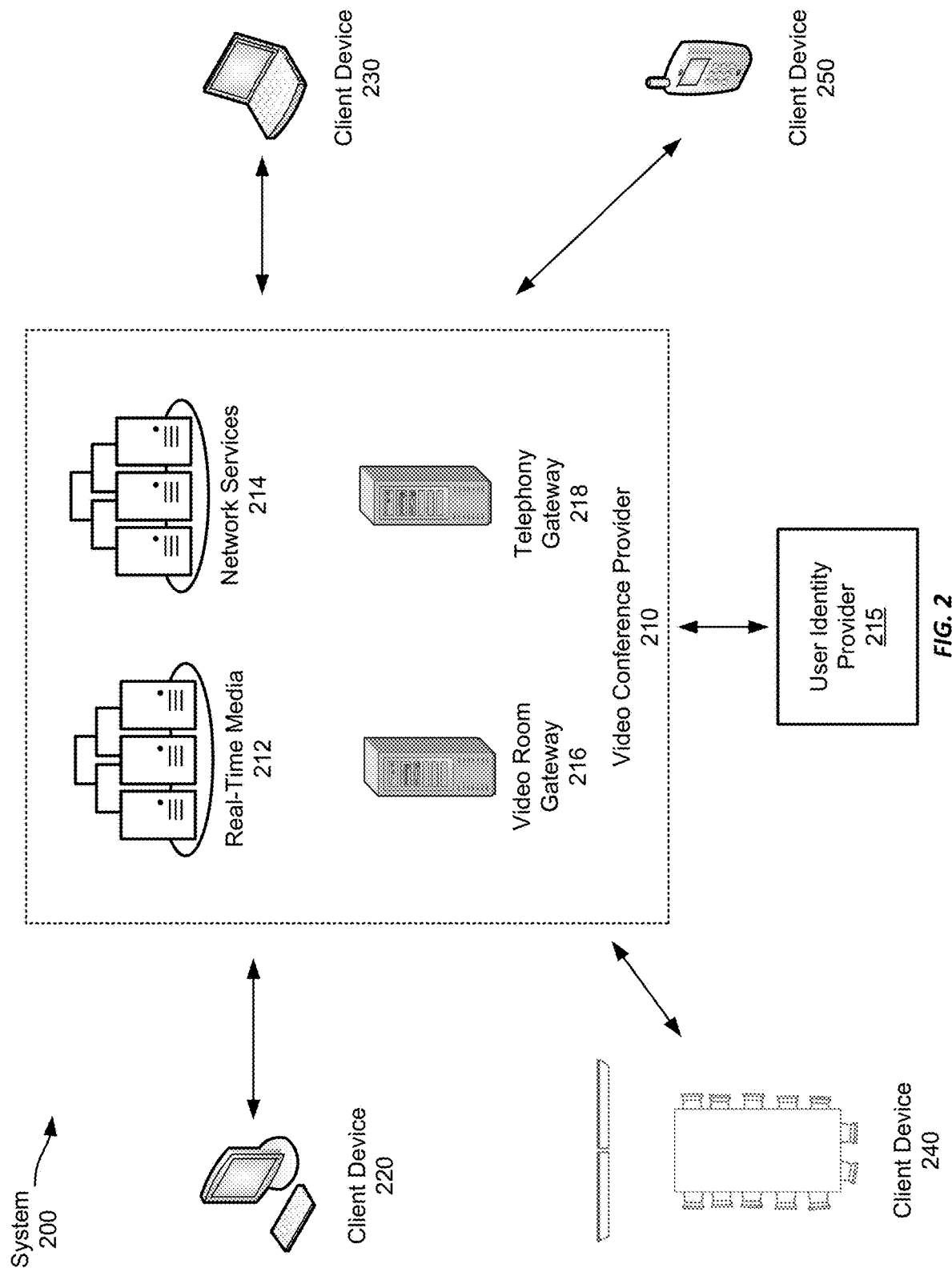
FIG. 2 illustrates an example system in which a video conference provider provides videoconferencing functionality to various client devices, according to an embodiment herein.

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "a webinar watch-party". A webinar watch-party as provided herein may be a "room" that is associated with a "main" videoconference room or "main meeting". Thus, participants with permissions in the main videoconference room may exit the room into a webinar watch-party, e.g., to discuss a particular topic, before returning to the main meeting.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started or the host may be required to specifically admit one or more of the users. As described in more detail below, depending on the authentication information of a given user, a user may be admitted to the main meeting or the webinar watch-party.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode. As discussed in detail below, in some embodiments, the meeting may terminate for only one room, thereby disconnecting only participants in that room. For example, the webinar watch-party may terminate and disconnect participants in the webinar watch-party but the main meeting may continue allowing participants therein to continue receiving audio and video streams.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can making conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different Examples of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the webinar watch-party or main meeting, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to move one or more participants to the webinar watch-party, such a command may also be handled by a network services server 214, which may provide authentication information to the one or more participants for joining the webinar watch-party and then connect the one or more participants to the webinar watch-party similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

If a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3A:
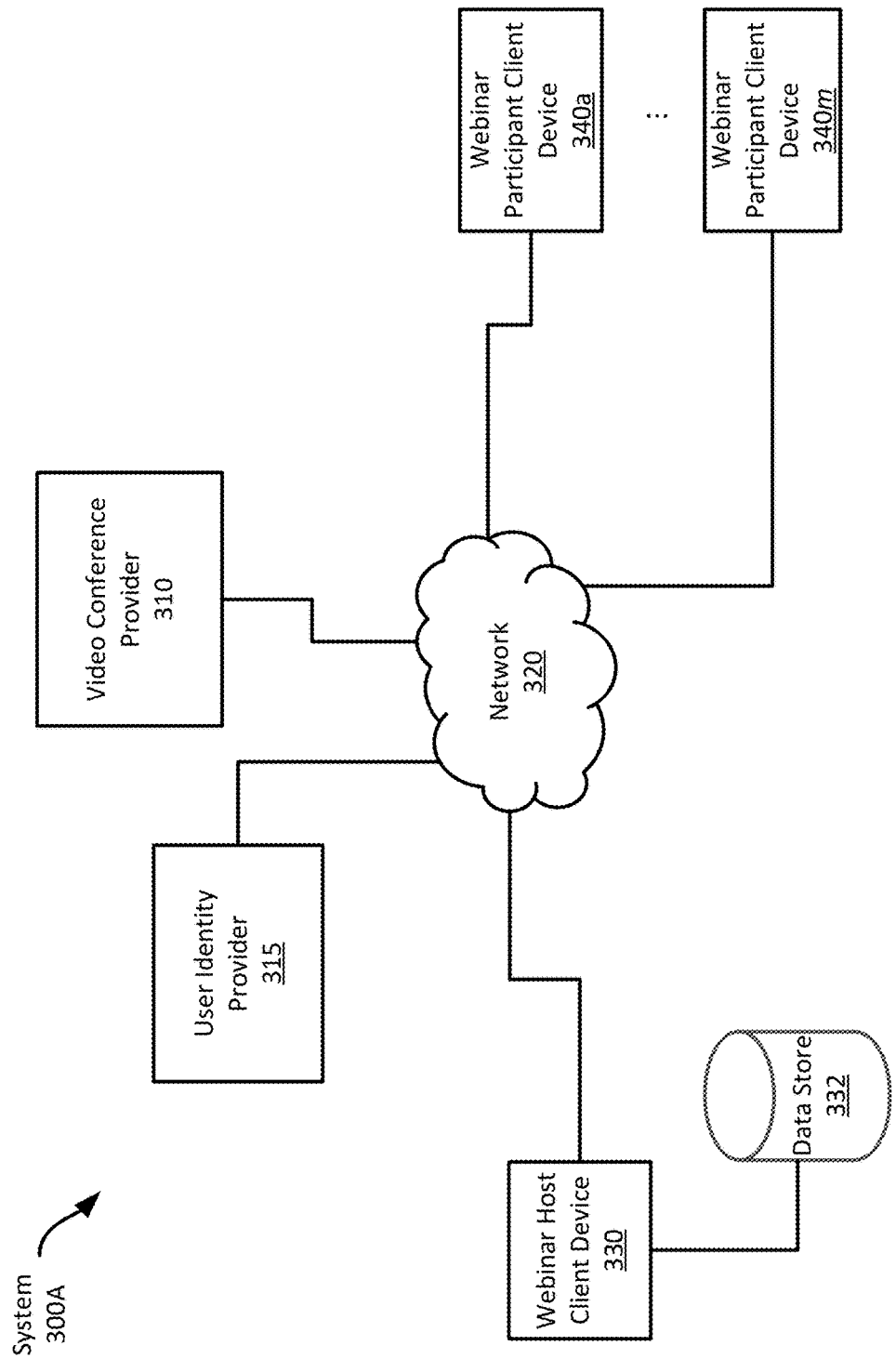
FIG. 3A illustrates an example system for providing a webinar watch-party during a meeting or webinar, according to an embodiment herein.

Referring now to FIG. 3A, FIG. 3A shows an example system 300A for providing a webinar watch-party during a meeting or webinar. In this example, a video conference provider 310, such as the video conference provider 110, 210 in FIG. 1 or 2, is connected to a communications network 320, such as the internet. A webinar host client device 330, a user identity provider 315, and a number of webinar participant client devices 340a-m (m representing any number of webinar participant client devices in this example) are also connected to the network 320.

The webinar host client device 330 connects to the video conference provider 310 and begins a webinar meeting (or "webinar") at the video conference provider 310, such as by beginning a scheduled webinar, generally as described above with respect to FIGS. 1 and 2. However, when scheduling the meeting, the host schedules the meeting as a webinar. In this example, the video conference provider 310 creates and manages webinar meetings similarly to how it handles conventional meetings as discussed above. However, because webinars generally are intended to operate one-way from the presenter(s) to the participants, the video conference provider 310 may limit certain functionality to general participants to the webinar.

For example, in a webinar the video conference provider 310 may prevent participants from unmuting their microphone or from streaming video to the webinar for other participants to view. In addition, unlike in a conventional meeting, the participants in a webinar may not receive any information about other participants in the webinar. In a conventional meeting, participants may be able to interact with other participants and see their respective names, such as in close proximity to other participants' video streams or in a list of participants visible in a graphical user interface ("GUI"). Instead, in a webinar, the participants may only be able to see information, e.g., names or video feeds, from the host(s) of the webinar or certain select participants that will be engaged in discussions during the webinar, such as panelists in a panel discussion. Still other limits may be imposed on the various participants, such as their ability to react to occurrences during the webinar, e.g., participants may be allowed to interact with their GUI to raise their hand to ask a question, but may not be allowed to provide any other feedback.

When the video conference provider 310 begins the webinar, it creates a new meeting (including any applicable restrictions, such as those discussed above) and provides video and audio feeds that may be accessed by participants to receive video and audio content during the webinar. Participants, through their respective webinar participant client devices 340*a-m*, may join the webinar once it has started and connect to the available video and audio feeds. As noted above, however, restrictions are often applied to the participants level of involvement with the webinar. These limitations on participants' involvement during the webinar may cause webinar participants to feel isolated and thereby have a less engaging experience during the webinar.

Figure 3B:
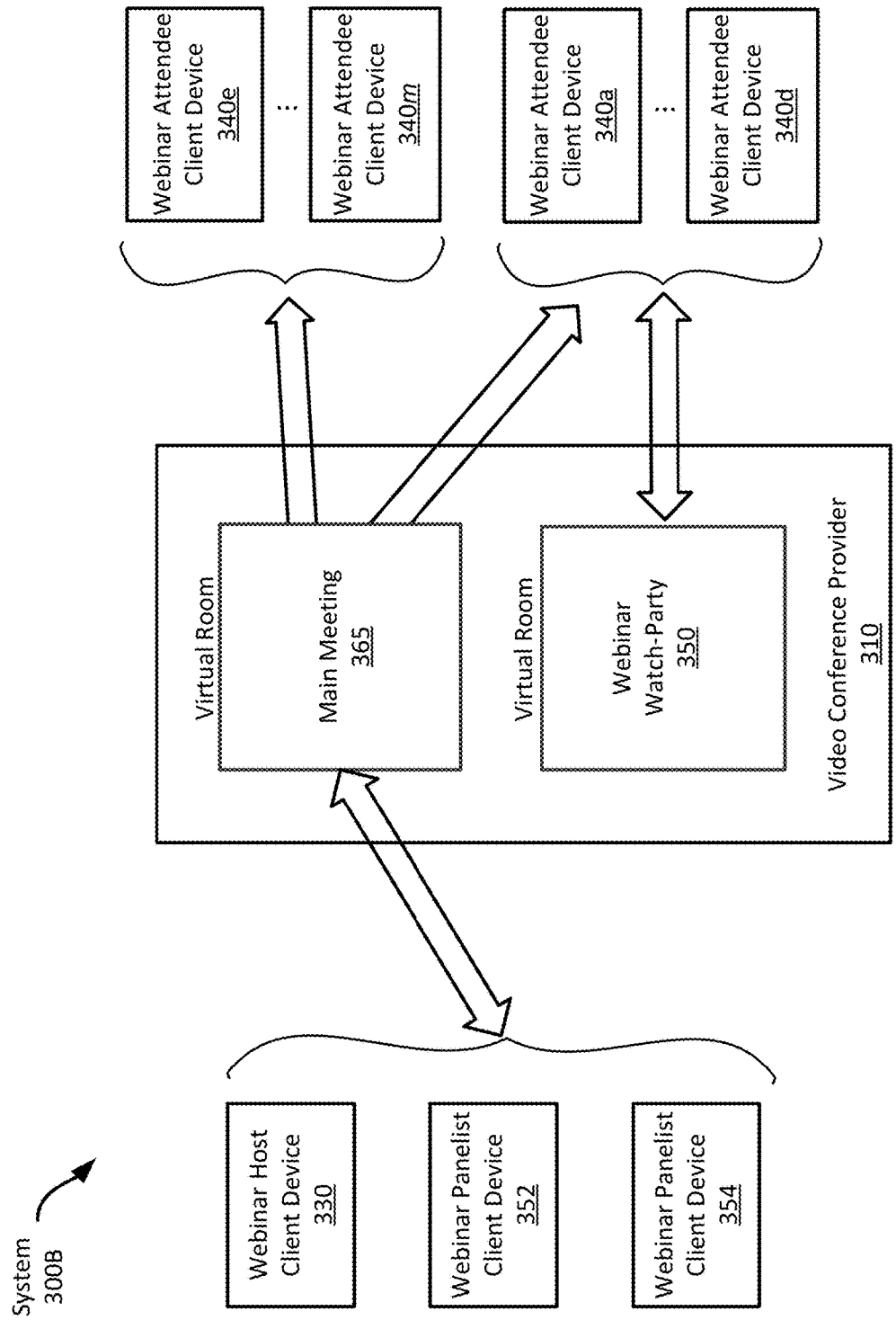
FIG. 3B illustrates an example system for providing a webinar watch-party during the webinar main meeting, according to an embodiment herein.

To provide webinar participants a more engaging experience, participants may attend a webinar via a webinar watch-party. FIG. 3B illustrates a system 300B for providing a webinar watch-party 350 during the webinar main meeting ("main meeting") 365. In one example, video conference provider 310 may establish a main meeting 365, which hosts the webinar. Video conference provider 310 may also establish the webinar watch-party 350, in which a participant can experience the webinar with one or more other participants.

The main meeting 365 and the webinar watch-party 350 may be considered virtual "rooms" in which participants of the webinar can meet and communicate. Main meeting 365 is a virtual "room" in which all participants of the webinar can virtually meet. The webinar watch-party 350 may be a virtual "room" in which select participants assigned to the webinar watch-party 350 can virtually meet and communicate during the ongoing webinar event in the main meeting 365. As will be described in greater detail with respect to FIG. 4, a participant may be assigned to the webinar watch-party 350 and based on that assignment, the participant may join the webinar watch-party 350.

There may be different types of webinar watch-parties 350. For example, there may be open watch-parties, private watch-parties, hidden watch-parties, VIP watch-parties, and invite-only watch-parties. The types of watch-parties may vary by degree of visibility and accessibility by participants. The details of the different types of webinar watch-parties are described in greater detail below.

During a webinar, there may be more than one webinar watch-party 350. In fact, there may be any number of webinar watch-parties during a give webinar. The number of watch-parties may depend on the number of participants in the webinar or the number of watch-parties that are established before or during the webinar. As will be described in greater detail below, a webinar watch-party, such as the webinar watch-party 350, may be established prior to initiation of the webinar in the main meeting 365. In an example embodiment, participants may be assigned to the webinar watch-party 350 prior to joining the webinar and upon joining the webinar the assigned participants may be joined to the webinar watch-party 350.

The ability of a participant of a webinar to establish a webinar watch-party and invite (e.g., assign) other participants to a webinar watch-party may depend on the role of the participant in the webinar. Participants of the webinar may have various types of roles. For example, there may be one or more host role(s) (e.g., the participant corresponding to webinar host client device 330), one or more panelist role(s) (e.g., the participants corresponding to webinar panelist client devices 352, 354), and one or more attendee role(s) (e.g., participants corresponding to webinar attendee client devices 340*a*-340*m*). Depending on the role of a particular participant in the webinar, various restrictions may apply, including the ability of the participant to establish a webinar watch-party, assign participants to the webinar watch-party, and join an established webinar watch-party.

A host may have little to no restrictions. The level of restrictions for a host role may be set by the video conference provider 310 or by the host. In cases where there is a co-host or more than one host role, hosts may have varying levels of restrictions. For example, a main host (e.g., the host who arranged the webinar) may be running late and assign another participant the role of co-host to begin the webinar on time. The main host may also assign various restrictions to the co-host, such as not allowing the co-host to change the roles of other participants.

The host may be able to establish webinar watch-parties prior to or during a webinar and assign participants to one or more webinar watch-parties. The host may also be able to join any webinar watch-parties during a webinar, regardless of the type of webinar watch-party. For example, a host may be able to join a VIP webinar watch-party to evaluate participants and discussions during the VIP webinar watch-party.

Panelists of the webinar may have more restrictions than the host. The level of restriction of the panelist role may be set by the host or the video conference provider 310. The panelist may be able to present content, including audio and video streams, on the main meeting 365 and may be allowed to access the webinar watch-party. The panelist, however, may not be able to change the roles of other participants or admit/invite other participants to the webinar. The ability of a panelist to establish a webinar watch-party and assign participants to the webinar watch-party may depend on the settings of the webinar. The settings may be determined by the host(s) or the video conference provider 310. In some embodiments, the panelists may be able to establish a webinar watch-party and assign participants to that webinar watch-party, while in other embodiments the panelists may not have authority to do so. Moreover, panelists may not have authority to invite participants to on-going webinar watch-parties or webinar watch-parties that are established by another participant (e.g., host, another panelist). Again, the authority of a panelist to establish and assign participants to a webinar watch-party may be determined by the settings of the webinar and the authorization settings of panelist role(s).

Attendees of the webinar may have numerous restrictions, including the ability to establish a webinar watch-party, assign participants to a webinar watch-party, or join a webinar watch-party that he or she is not assigned to. The ability of an attendee to establish a webinar watch-party and assign participants to that webinar watch-party may depend on the settings of the webinar and the settings of the attendee role. For example, in some embodiments, attendees may be unable to establish a webinar watch-party or assign participants to a webinar watch-party. In other embodiments, however, the webinar settings may allow attendees to establish a webinar watch-party and assign participants to it. For example, when a participant, such as an attendee, registers for a webinar, there may be an option to "create a webinar watch-party" for the webinar. Upon selection of that option, the participant may be able to establish a webinar watch-party and assign participants to the webinar watch-party. Participants that receive the assignment from the establishing participant may receive the assignment as part of the invitation, as discussed in more detail below with respect to FIG. 4. The receiving participants may have the option to deny or accept the assignment.

Attendees may have additional restrictions, such as the ability to share content in the main meeting 365. For example, the attendees of the webinar may be restricted such that they can only receive audio and video streams from the webinar main event but cannot contribute content to the webinar without approval from the host and/or panelist. In other words, during a webinar, video conference provider 310 receives multimedia streams from the webinar host client device 330 and from any other participant designated as a presenter, co-host, panelist, (e.g., panelists client device 352 and 354) etc.; however the video conference provider 310 does not receive such streams from attendees (except in limited circumstances in some examples, such as if an attendee is authorized by a host to ask a question), or the video conference provider 310 may receive attendee streams, but not provide them to other client devices. These restrictions, however, may diminish the webinar experience for attendees, thereby making the webinar a less engaging experience for attendees since they are not able to view the other participants in the webinar.

To make webinars more engaging for participants, including attendees, two or more participants may attend the webinar as part of the webinar watch-party 350. For example, as illustrated, Attendees A to D, corresponding to webinar attendee client devices 340a-340d, may attend the webinar by joining the webinar watch-party 350. In webinar watch-party 350, webinar attendee client devices 340a-340d may receive audio and video streams from both main meeting 365 and webinar watch-party 350. Participants in the webinar watch-party 350 are able to interact with the other participants in the webinar watch-party 350, such as by providing audio and video feeds and receiving audio and video feeds from other webinar watch-party 350 participants. Participants in the webinar watch-party 350, however, cannot interact with participants of main meeting 365. In other words, participants in the webinar watch-party 350 can talk and share content with each other in webinar watch-party 350 without participants of the webinar in main meeting 365 being involved. When other webinar watch-parties are established, the video conference provider 310 may join the assigned participants to their respective webinar watch-parties and provide the respective audio and video streams from other participants in that webinar watch-party, in addition to the audio and video streams from the main meeting 365.

In some embodiments, the host client device 330 may receive the audio and video streams from the webinar watch-party 350 as a means to check in on participants of the webinar watch-party 350. For example, the host client device 330 may automatically receive the audio and video streams from the webinar watch-party 350 during the webinar. In another example, the host client device 330 may enter the webinar watch-party 350 as desired to receive the audio and video streams but may not continuously and/or automatically receive the audio and video streams from the webinar attendee client devices 340a-340d. In this manner, the host can monitor the webinar watch-parties as needed.

In some embodiments, not all attendees may have permission to access the webinar watch-party 350. As described in greater detail with respect to FIG. 4, to join the webinar watch-party 350, a participant may need an assignment. The assignment may be provided as part of the webinar invitation or in response to the participant's request to join the webinar watch-party 350. As illustrated by FIG. 3B, webinar attendee client devices 340e-340m may only receive multimedia streams from main meeting 365. And only in the event that permission is granted to webinar attendee client devices 340e-340m may the video and audio streams from the webinar attendee client devices 340e-340m be received by the video conference provider 310 and transmitted to other participants of main meeting 365. The webinar attendee client devices 340e-340m may receive permission by requesting to join the webinar watch-party 350 and receiving an assignment to the webinar watch-party 350, or the webinar attendee client devices 340e-340m may receive the assignment to the webinar watch-party 350 as part of the invitation to the webinar.

A participant, including an attendee, panelist, host, etc., may be assigned to a webinar watch-party, such as webinar watch-party 350, prior to the start of the webinar. For example, the host or video conference provider 310 may assign a participant to a webinar watch-party in the meeting invitation. In other cases, the host may assign a participant to a webinar watch-party during the webinar. And in still other examples, a participant may request to join a webinar watch-party during the webinar. When a participant is assigned to or receives permission to join a webinar watch-party, the participant may be automatically joined to the webinar watch-party.

Figure 4:
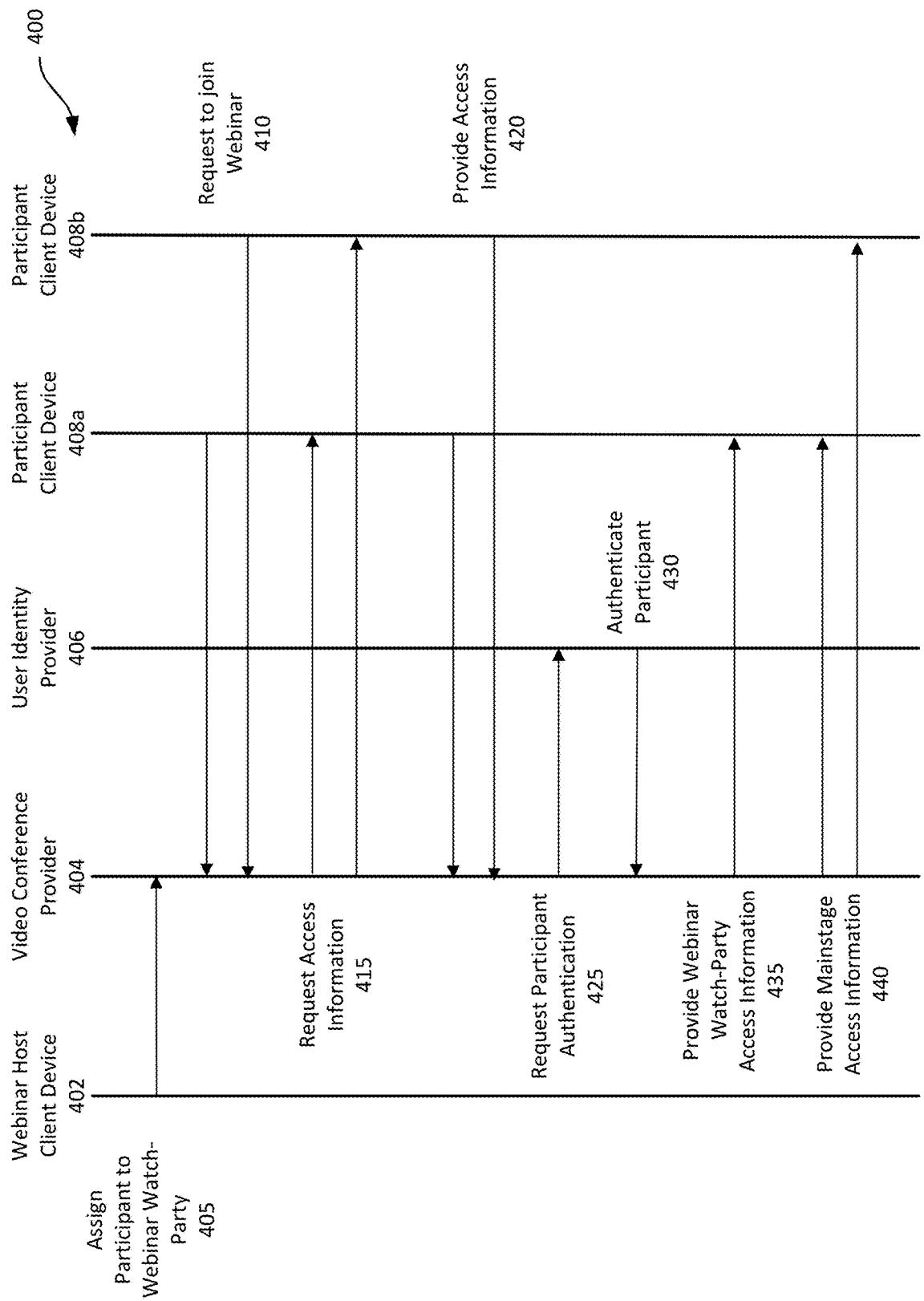
FIG. 4 illustrates an example sequence of events for providing a webinar watch-party during a webinar, according to an embodiment herein.

Referring now to FIG. 4, FIG. 4 shows an example sequence 400 of events for providing a webinar watch-party during a webinar. Sequence 400 is described with respect to a system that includes a video conference provider 404, a user identity provider 406, a webinar host client device 402, and a participant client devices 408a and 408b. While participant client devices 408a and 408b are discussed with respect to FIG. 4, it should be appreciated that any number of participant client devices may participate in the sequence. Further, sequence 400 assumes that webinar host client device 402 and participant client devices 408a and 408b are all participating in the same on going webinar hosted by video conference provider 404.

At some time before or during the webinar, a participant may be assigned to a webinar watch-party (405). A participant may be assigned to a webinar watch-party in a variety of manners. A common example may be that the host of the webinar assigns the participant to the webinar watch-party. The host may assign the participant to the webinar watch-party prior to the webinar. For example, the webinar watch-party assignment may be part of the meeting information in the webinar invitation that is distributed by the host. In such an example, video conference provider 404 may receive and store information relating to a participant's webinar watch-party assignment. In other embodiments, the host may assign or change a participant's watch-party assignment during a webinar. In such cases, video conference provider 404 can actively update the participant's watch-party assignment, and related access information, when the host makes the change/assignment.

In some embodiments, there may be an algorithm that determines which webinar watch-party a participant is assigned to. The algorithm may be based on one or more parameters relating to the participant, a topic of the webinar watch-party and/or the other participants that have been assigned to that webinar watch-party. In the physical world, a webinar attendee may walk into the conference room and see green chairs that are assigned for marketing and blue chairs that are assigned for engineering. Based on that webinar attendee's role in the company, the webinar attendee may sit in his or her assigned area. Similarly, in the virtual space, the algorithm may assign the webinar attendee to a webinar watch-party corresponding to the webinar attendee's role or employment position.

In some embodiments, the assignment to the webinar watch-party may serve as a networking function. For example, as noted above, the assignment of a participant to a webinar watch-party may be performed by an algorithm. The algorithm may use one or more parameters involving the participant. For example, in a webinar based on career development, participants seeking a job may be attending in hopes of meeting individuals from a specific company. When filling out a request to attend the webinar, the participants may be prompted to input information such as career areas and/or companies of interest. Using this information, a participant may be assigned to a webinar watch-party that also hosts participants in the career areas of interest or participants who work for a company of interest. In this manner, the webinar watch-party may serve a networking function for webinar participants.

Parameters that may be used to determine a participant's webinar assignment include a job title of the participant, an identity of the participant, an interest in a topic, a contribution from the participant, and/or a networking interest of the participant. In some embodiments, one or more of these parameters may be ranked by the participant or host by degree of importance. Then based on the ranking and the parameters corresponding to the participant, an assignment to a webinar watch-party may be determined.

In other embodiments, another participant may invite the participant to join the webinar watch-party. As will be discussed in greater detail below, whether a participant can invite another participant to join a webinar watch-party or a participant can request to join a webinar watch-party will depend on the type or permissions level of the watch-party. For example, some webinar watch-parties may be private, meaning that only those who are assigned by the host may join, and other webinar watch-parties may be open, meaning that any participant of the webinar can request and receive permission to join. Accordingly, the permissions level of the webinar watch-party may determine how the watch-party assignment is received.

In some embodiments, a participant may establish a webinar watch-party upon registering for the webinar. For example, as part of the registration process for a webinar, the participant may have an option to establish a webinar watch-party. When establishing the webinar watch-party, the participant may provide details regarding the requested webinar watch-party, such as the name of the webinar watch-party and the participants he or she wishes to join to the webinar watch-party. A host or the video conference provider 310 may approve the requested webinar watch-party and the participants listed in the details of the requested webinar watch-party may receive the assignment to that webinar watch-party.

If a participant wishes to join a webinar watch-party during a webinar, the participant may send a request to join the webinar watch-party. As described in more detail below, the request may be sent to the host or video conference provider 310, who may approve or deny the request. The approval or denial of the request to join a webinar watch-party may be determined by various factors, such as the type of webinar watch-party, the webinar settings, or the host's judgement.

To join the webinar, participant client device 408a may transmit a request to join the webinar to video conference provider (410). In response to the request to join the webinar, video conference provider 404 may request access information from participant client device 408a (415). The request for access information from the participant client device 408a may include a request for meeting information, such as for example, meeting ID, password, and identification information. Identification information may include information associated with the identity of the user of the participant client device 408a, such as a username, an email address, an account identifier, a device name, a device ID, a telephone number, etc. In different examples, different types of identification information may be provided. A participant's watch-party assignment may be included in the access information. Participant client device 408b may request to join the webinar via the same or similar steps (410) and (415).

In response to the request for access information (415), participant client devices 408a and 408b may provide access information to video conference provider 404 (420). In some embodiments, access information may be transmitted as part of the request to join the webinar (410). In such cases, the above steps (415) and (420) would not be part of sequence 400.

Video conference provider 404 may request participant authentication after receiving the access information from participant client devices 408a and 408b (425). When the video conference provider 404 receives the request for the access information, the video conference provider 404 confirms the identity of the participant and the watch-party assignment. As noted above, in some embodiments a host or other participant may invite a participant to join a webinar watch-party during the webinar. In other embodiments, a participant may request to join the webinar watch-party during the webinar. In such cases, the invitation to join or the acceptance of the request to join the webinar watch-party may include access information to the webinar watch-party. Upon inviting the participant or accepting the participant to join, the client device associated with the participant may receive updated access information. The updated access information may include permission for the participant to have access to the webinar watch-party. The video conference provider 404 may use the updated access information to then allow the participant to join the webinar watch-party.

Video conference provider 404 may attempt to authenticate the user of the participant client device 408a (or simply the participant client device 408a itself). To do so, video conference provider 404 may transmit a request to authenticate the participant to a user identity provider 406 (425), generally as described above with respect to FIGS. 1 and 2. In response, the user identity provider 406 responds, in this example, that the participant has been authenticated (430). In response to receiving the authentication, the video conference provider 404 transmits access information to participant client device 408a to enable it to join the webinar watch-party, such as by subscribing to one or more multimedia streams associated with the webinar watch-party, or to obtain cryptographic keys to enable access to one or more multimedia streams of the webinar watch-party (435). The participant client device 408a can then join the webinar watch-party using the supplied access information.

Video conference provider 404 may also transmit access information to participant client device 408a to enable it to join the main webinar ("main meeting"), such as subscribing to one or more multimedia streams associated with the main meeting, or to obtain cryptographic keys to enable access to one or more multimedia streams of the main meeting (440). In some embodiments, when video conference provider 404 transmits access information to the participant client device 408a to enable it to join the webinar watch-party, video conference provider 404 may also transmit access information to enable the participant client device 408a to join the main meeting. In such cases, steps (435) and (440) may be combined.

In cases where the participant is an attendee of the webinar and does not have permission to access the webinar watch-party, step (435) may not be performed. Instead, video conference provider 404 may transmit access information for the main meeting (440). For example, as illustrated, the user of participant client device 408*b* may be an attendee without access to the webinar watch-party. In this case, video conference provider 404 may provide the main meeting access information to participant client device 408*b* (440). The main meeting access information may enable participant client device 408*b* to join the main meeting, such as by subscribing to one or more multimedia streams associated with the main meeting, or to obtain cryptographic keys to enable access to one or more multimedia streams of the main meeting. As noted above, participants who join the main meeting only have access to the multimedia streams associated with the main meeting and do not have access to the multimedia streams of the webinar watch-party. Thus, participant client device 408*b* would not receive multimedia streams from the webinar watch-party.

As mentioned above, the sequence 400 shown in FIG. 4 need not be performed as sequential steps, but instead, certain Examples may be performed asynchronously to others. For example, if multiple different client devices are attempting to join the webinar watch-party, each may progress through a sequence similar to sequence items 425-435, if the client is authenticated, or through a sequence similar to sequence items 425, 430, and 440, if the client is not authenticated, independently of the sequence items performed by other clients. Similarly, while this example illustrates the use of sequence items to authenticate participants, some examples may omit authentication. Thus, the system may restrict a client device to only joining the main meeting, but it may not otherwise attempt to authenticate the participant using the client device. Additionally, while the above steps 405-425 are discussed with respect to both participant client devices 408*a* and 408*b*, the steps may be performed independently for each client device.

As described above, the webinar watch-party can provide a space for participants to attend a webinar together. The webinar watch-party provides participants a space to talk and share about the webinar without disrupting the main webinar. The webinar watch-party may also provide a space for participants to network. For example, in the physical space, participants are able to meet and exchange pleasantries with nearby participants. In the virtual space, this type of interaction can be difficult because conventional webinar participants are unable to exchange audio and video streams. In contrast, in webinar watch-parties, participants can meet and share content with other participants, allowing a participant to meet and connect with individuals that he or she would otherwise have not had the chance to meet outside of the webinar watch-party.

Figure 5:
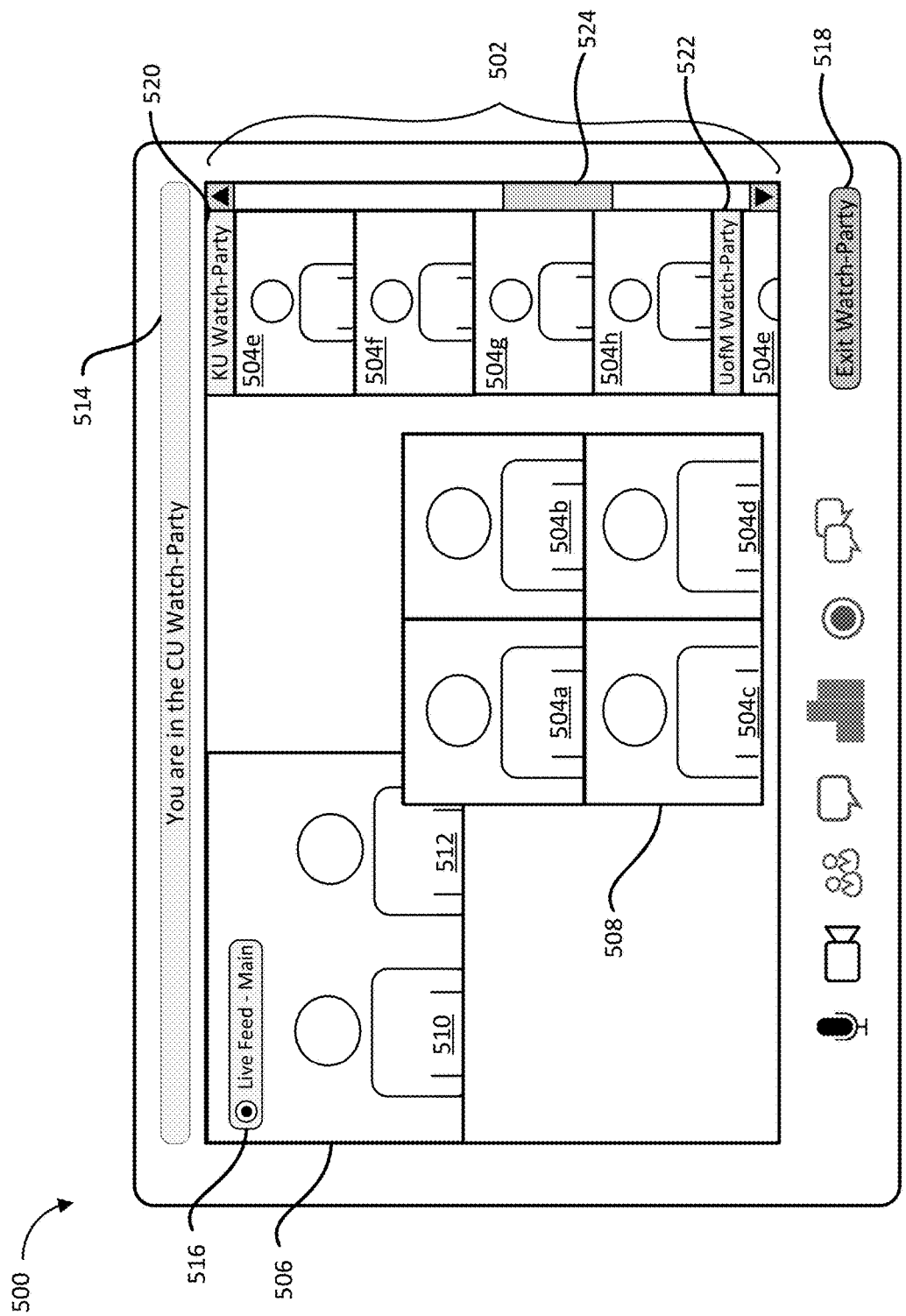
FIG. 5 illustrates a GUI for a webinar watch-party during a webinar main event, according to an embodiment herein.

Referring now to FIG. 5, FIG. 5 illustrates a GUI 500 for a webinar watch-party during a webinar main event, according to an embodiment. The GUI 500 may be presented to a participant, such as an attendee, in a webinar watch-party, such as webinar watch-party 350. The GUI 500 of FIG. 5 will be described with respect to systems shown in FIGS. 3A-B and 4, however, any suitable system according to this disclosure may be employed, including systems described with respect to FIGS. 1 and 2.

In some embodiments, the GUI 500 may be viewable to a participant of the video conference on the participant's device, for example the GUI 500 may be viewable to Participant A on the client device 404*a*. Presentation of the GUI 500 on the participant's device may be in response to the initiation of the video conference. As noted above, in some embodiments, upon joining a webinar, a participant may be automatically joined into a webinar watch-party, such as webinar watch-party 350. In other words, upon joining the webinar, the participant receives both the multimedia streams from the main meeting of the webinar, such as the main meeting 365, and the multimedia streams from the webinar watch-party. When the participant is joined into a webinar watch-party, the participant may be presented with the GUI 500 of the webinar watch-party.

The GUI 500 may include two displays: display 506 and display 508. The display 506 may display one or more video streams from the main meeting, such as the main meeting 365. For example, once the main webinar is initiated, the video and audio streams may be transmitted to the participants of the webinar. The display 506 may display the video stream of currently speaking participants 510 and 512 from the main webinar. The audio stream from the participants 510 and 512 may also be transmitted along with the video stream provided in the display 506. In some embodiments, the display 506 may include two or more windows providing the video streams from multiple speaking participants from the webinar main event.

Once the webinar watch-party is initiated, video and audio streams may be exchanged between the participants 504*a-d* within the webinar watch-party (watch-party participants 504*a-d*). The display 508 may display the video streams from the client devices of the watch-party participants 504*a-d*. The audio stream from participants 504*a-d* may also be transmitted along with the display 508. It should be appreciated that while the display 508 is positioned to be a central focus of the GUI 500 over the display 506, the displays 506 and 508 may be presented on the GUI 500 in any arrangement and size. For example, in some embodiments, the display 506 of the main meeting may be the focal point of the GUI 500, while the display 508 of the watch-party participants 504*a-d* may be positioned to the side or in an otherwise non-focus point of the GUI 500.

While in the webinar watch-party, participants 504*a-d* can receive at least two audio streams: one from the main meeting 365 and one from the webinar watch-party 350. Upon joining the webinar watch-party 350, the client devices of the watch-party participants 504*a-d* may be configured to target and provide audio from the webinar watch-party 350 over the audio from the main meeting 365 (e.g., increase the volume of audio from the webinar watch-party 350 while decreasing or muting the audio from the main meeting 365), since the sounds from the two virtual meeting rooms would likely overlap, be difficult to understand, and may lack saliency if they were output to the client device at the same time.

In some embodiments, the participants 504*a-d* may receive more than two audio streams. For example, the participants 504*a-d* may receive one or more audio streams from the main meeting and one or more audio streams from the various participants in the webinar watch-party. This example may occur in embodiments where there is not a common audio feed from the webinar watch-party. Instead, the participants 504*a-d* may receive an individual audio stream from each webinar watch-party participant.

To prevent the watch-party participants 504*a-d* from receiving the two audio streams at full volume at the same time, the watch-party participants 504*a* and 504*b* can adjust the volume of audio streams from the main meeting 365 to a background level while the audio streams from the webinar watch-party 350 remain at a normal audio level. In some cases, the audio level of each respective audio stream may be automatically adjusted upon entry into the webinar watch-party 350. For example, upon joining the webinar watch-party 350, the audio from the main meeting 365 may be reduced to a background level and the audio from the webinar watch-party 350 may be provided at a normal level. In another example, the opposite volume levels may be set (e.g., the webinar watch-party 350 set to a background level and the main meeting 365 set to a normal level). The watch-party participants 504a-d may have the option to receive audio streams from both the main meeting 365 and the webinar watch-party 350, such as by reducing the volume of one of the two audio streams, or by playing each audio stream from a different audio output device, e.g., the main meeting audio is played from the left speaker and the webinar watch-party audio is played from the right speaker.

The GUI 500 may provide an indication 514 to indicate to the watch-party participants 504a-d that they are in a webinar watch-party (e.g., the "CU Watch-Party"), and not in the main meeting. For example, as illustrated, the indication 514 may notify or otherwise indicate that the watch-party participants 504a-d are in a webinar watch-party. In some embodiments, instead of a banner, like the indication 514, the background of the GUI 500 may change colors, or the display 506 of the main meeting may highlight or pulse to indicate that the watch-party participants 504a-d are watching the main meeting from a webinar watch-party. In some embodiments, an indication 516 may be provided on the display 506 indicating that a live feed stream from the webinar main meeting is being displayed on the display 506

In some examples, the indication 514 may also indicate the specific webinar watch-party that a watch-party participant is in. For example, as illustrated, the indication 514 may specify that the watch-party participants 504a-d are in the "CU Watch-Party." This may allow a participant to orient himself or herself if there is more than one webinar watch-party.

The GUI 500 may include a roster 502 of a plurality of participants that are in the webinar. The roster 502 may include all the participants that have joined the webinar, both in the main meeting and/or in a webinar watch-party. In some embodiments, the roster 502 may also list the webinar watch-parties that are established in the webinar, depending on the type of webinar watch-party (e.g., a hidden watch-party may not be visible on the roster 502). As illustrated, the roster 502 indicates that there is at least a "KU Watch-Party" and a "UofM Watch-Party" in addition to the "CU Watch-Party" that the participants 504a-d are part of, as indicated by the indication 514

The roster 502 may include a video stream of the plurality of participants 504a-d that have joined the webinar event. In other embodiments, the roster 502 may include a picture, image, representation, avatar or a listing of the plurality of participants 504a-d. When a participant joins the video conference, the joining participant is added to the roster 502. As illustrated, the roster 502 may be extensive and include more participants than only participants 504a-d. For example, scroll 524 may allow a user to scroll through the roster 502 to see other participants.

In some embodiments, the roster 502 may only include a participant count. The visibility of participant information may be dependent on the privacy settings of the webinar. The privacy settings may also determine the visibility of the webinar watch-party and whether participants in the main meeting or in another webinar watch-party can see a listing of participants in a given webinar watch-party. For example, as illustrated, the roster 502 includes a watch-party listing 520 of participants in a first webinar watch-party (e.g., "KU Watch-Party") and a watch-party listing 522 of participants in a second webinar watch-party (e.g., "UofM Watch-Party"). The participants 504e-h may be part of the KU webinar watch-party, at least participant 504e may be part of the UofM webinar watch-party, and the participants a-d may be part of the CU webinar watch-party. The watch-party listings 520 and 522 may be visible to participants not in those watch-party or participants who do not have permission (e.g., access information) if the webinar watch-party is an open watch-party.

As noted above, there may be different types of webinar watch-parties. The different types of webinar watch-parties may allow different degrees of visibility and accessibility to participants. Open webinar watch-parties, as just described, may allow participants not in the webinar watch-party ("outside participants") to see the webinar watch-party, and in some cases, see the watch-party listing of participants within the webinar watch-party, such as listings 520 and 522. In some embodiments, open webinar watch-parties may also grant an outside participant access information and thereby permission to enter a webinar watch-party. In other words, any participant can join an open webinar watch-party.

Other types of webinar watch-parties may include private watch-parties, hidden watch-parties, VIP watch-parties, and invite-only watch-parties. A private watch-party may be webinar watch-party in which outside participants are not allowed access to the private watch-party unless the outside participant receives an invitation from the webinar host(s) or a participant in the private watch-party with authority to grant access. For example, in some embodiments, a webinar host may grant a participant in a private watch-party the authorization to admit (e.g., invite) outside participants into the webinar watch-party. If an outside participant does not receive an invitation to the private watch-party, then the outside participant cannot join the private watch-party.

In some cases a private watch-party may also be a hidden watch-party. A hidden watch-party may be a webinar watch-party in which the listing of participants is not provided on roster 502. In some examples, outside participants may have no indication that the hidden watch-party exists. Thus, unless an outside participant receives an invitation to join the hidden watch-party, the outside participant cannot join or have knowledge of the hidden watch-party.

In some examples, a private watch-party may be a VIP watch-party. A VIP watch-party may be similar to a private watch-party in which an outside participant cannot join the VIP watch-party unless the outside participant receives an invitation. The VIP watch-party may vary from a private watch-party in how participants are assigned to the webinar watch-party. For example, a private watch-party may be a setting that an organizer (e.g., webinar host) selects when arranging the private watch-party. The organizer may then select other parameters for determining which participants are assigned to which webinar watch-party, such as the participant's interest in a topic, career choice, department, or, in some cases, randomly. For a VIP watch-party, the selection of making the watch-party a VIP watch-party may require one or more predetermine parameters be met for a participant to be assigned to the VIP watch-party. For example, a participant may need to meet a threshold level of one or more predetermined parameters, such as seniority within an organization, to be assigned to the VIP watch-party. Access information of a participant may be analyzed to determine whether a threshold level of one or more parameters is met, and if so, the participant may be automatically assigned to a VIP watch-party.

To help further illustrate a VIP watch-party, the following example embodiment is provided. In a university career development webinar, Participant A may be assigned to a CU VIP watch-party in the webinar invitation. The CU VIP watch-party may include the Dean of CU along with other influential CU employees, thus may be a desirable webinar watch-party to be assigned to if Participant A is seeking a career at CU. The Dean of CU and the influential CU employees may have been assigned to the CU VIP watch-party by the webinar host. Participant A, on the other hand, may have been assigned to the VIP watch-party because Participant A met threshold levels of various parameters for receiving the assignment. For example, to be assigned to the CU VIP watch-party, a participant may need to be a senior in college, having a GPA of more than 3.75, and have experience working in a university environment. Thus, because Participant A is a senior at CU, having 3.9 GPA, and has experience in university admissions, Participant A receives an assignment to the CU VIP watch-party as part of the webinar invitation.

As noted above, participants may provide information relating to parameters used for watch-party assignments when they register for a webinar. In some cases, the participants may also provide the information when joining a webinar. If the participants provide the information when joining the webinar, the participants may be assigned to a webinar watch-party when they join the webinar.

Once watch-party participants 504a-d enter the webinar watch-party, which could be upon joining the webinar, their representations as part of the roster 502 may change. If the watch-party participants 504a-d's representations in the roster 602 remain as a current video stream from their respective client devices, it could be confusing to outside participants in the main meeting to see the participants 504a-d speaking without hearing the audio streams. As such, it could be desirable for the watch-party participants representations to change from a live video stream to a less conspicuous representation. For example, upon entering a webinar watch-party a participant's representation may change from a live video stream to a static or generic picture of the participant. Additionally, a participant's representation on roster 502 may change depending on the type of webinar watch-party. As noted above, some webinar watch-parties are hidden from outside participants, and as such, when a participant joins a hidden watch-party, the participant's representation may be removed from the roster 502. In some cases, if there is a webinar participant count, the participant may still be counted as part of that count. In other cases, even when a participant enters a hidden webinar watch-party, the participant may still be present on a webinar roster, however, the participant may not be shown as being in the hidden watch-party.

In some cases, one or more of watch-party participants 504a-d may want to exit the webinar watch-party and attend the webinar from the main meeting. For example, participant 504a may find the webinar watch-party to be distracting and want to focus on the webinar. To do so, the GUI 500 may include an exit watch-party button 518. If participant 504a wishes to return to the main meeting and exit the webinar watch-party, the participant 504a may select the exit watch-party button 518 and the participant 504a may be returned to the main meeting. Upon exiting the webinar watch-party, the audio and video streams from the webinar watch-party may terminate transmission to the client device of the participant 504a and the participant 504a may only receive the audio and video streams from the main meeting. As noted above, while in the webinar watch-party, the audio streams from the main meeting may be reduced or even muted. In such cases, when the participant 504a returns to the main meeting, the audio streams from the main meeting may return to their normal volume.

Figure 6:
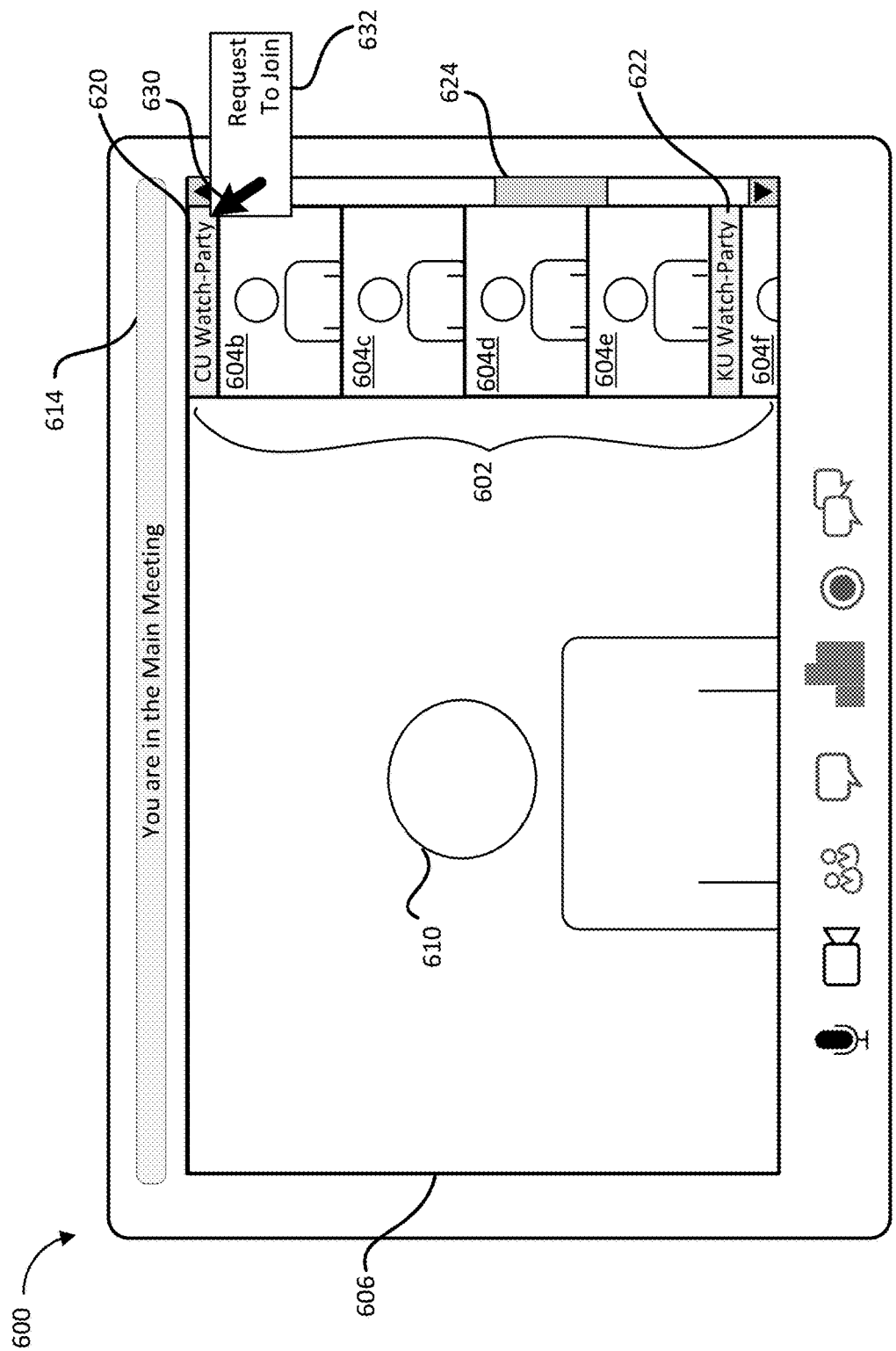
FIG. 6 illustrates a GUI for a main meeting during a webinar, according to an embodiment herein.

Turning now to FIG. 6, a GUI 600 is provided for a main meeting, according to an embodiment herein. The GUI 600 may be presented to a participant or a host during a main meeting, such as the main meeting 365. For example, after returning to the main meeting, the GUI 500 for the participant 504a may transition to the GUI 600. The following figures and related components, such as GUI 600 of FIG. 6, will be described with respect to systems shown in FIGS. 3A-B, 4, and 5 however, any suitable system according to this disclosure may be employed, such as those described in FIGS. 1 and 2.

In some embodiments, the GUI 500 is viewable to a participant of the video conference on the participant's device, for example the GUI 500 may be viewable to Participant A on the client device 404a. Presentation of the GUI 500 on the participant's device may be in response to the initiation of the video conference or after a participant exits a webinar watch-party, such as webinar watch-party 350.

To indicate to a participant, such as participant 604a (not shown but viewing the GUI 600), that he or she is in the main meeting, and not in a webinar watch-party, an indication 614 may be provided. The indication 614 may be the same as the indication 514, except that it changed to indicate that the participant 604a is in the main meeting. The indication 614 may be helpful for the participant 604a to know that his or her audio and video streams are no longer being transmitted to participants in a webinar watch-party, and in the event the participant has permissions to share content during the webinar, to indicate that the audio and video streams may be shared with the main meeting. If the participant 604a has permission to share content during the webinar, and the participant 604a joins a webinar watch-party during the main meeting, the participant 604a could easily become confused as to which virtual meeting space he or she is in and accidently say or share something in the main meeting meant for the webinar watch-party.

The GUI 600 may include a display 606 of the main meeting. The display 606 may display the video stream of a currently speaking participant 610 from the main meeting. The display 606 may be the same as the display 506, however, after leaving the webinar watch-party, the display 506 may be resized and/or rearranged to the display 606 as the display 508 is removed. The audio stream from the participant 610 may also be transmitted along with the display 606. In some embodiments, more than one participant may be speaking, and in such cases, display 606 may include two or more windows providing the video streams from the speaking participants.

The GUI 600 may include a roster 602. The roster 602, similar to the roster 502, may include a plurality of participants in the webinar. The roster 602 may include all the participants that have joined the webinar, both in the main meeting and/or in a webinar watch-party. As noted above, the roster 602 may include a video stream, a picture an image, a representation, or an avatar of each of the participants in the webinar, depending on the privacy settings. If a participant is part of a hidden watch-party, then the participant may not show up on the roster 602. As webinars are often attended by tens of hundreds of people, the roster 602 may include a scroll 624 that can allow a user to scroll through the roster 602 to see other participants.

As illustrated, the roster 602 may indicate which webinar watch-party a given participant is in. For example, roster 602 includes a watch-party listing 620 that indicates that participants 604b-604e are part of the CU watch-party and includes a watch-party listing 622 that indicates at least participant 604f is part of a KU watch-party. By scrolling using scroll 624, additional watch-party listings may be provided on the roster 602.

If participant 604a wants to join a webinar watch-party visible on the roster 602, the participant 604a may select the watch-party that he or she wishes to join and send a request to join. For example, as illustrated, the participant 604a may use selector 630 to select the desired webinar watch-party: CU watch-party. The selection may provide an option 632 to send a request to join the webinar watch-party. The participant 604a may select the option to request to join the CU watch-party and the request may be transmitted via the video conference provider to a host or other participant having permission to grant access to the webinar watch-party, as described above with respect to FIG. 4. If permission to join is granted, the participant 604a may receive access information for joining the CU watch-party and be automatically joined to the watch-party.

Figure 7:
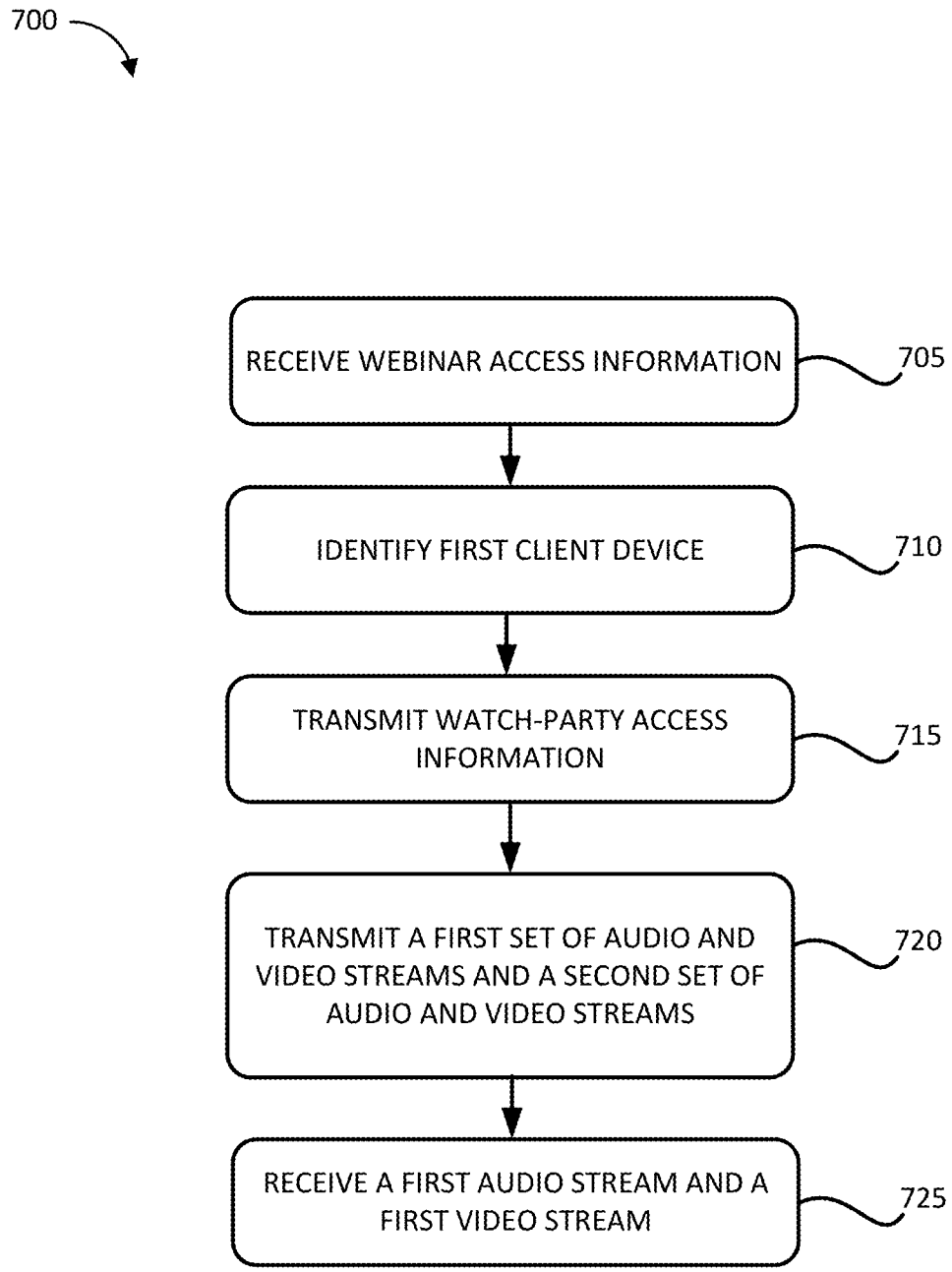
FIG. 7 illustrates an example method for providing webinar watch-parties during a webinar, according to an embodiment.

Referring now to FIG. 7, a flowchart of an example method 700 for providing a webinar watch-party during a webinar is provided. The description of the method 700 in FIG. 7 will be made with reference to FIGS. 3A-6, however any suitable system according to this disclosure may be used, such as the example systems 100 and 200, shown in FIGS. 1 and 2.

The method 700 may include a step 705. At step 705, webinar access information may be received from a first client device. For example, the webinar access information may be received by a video conference provider, such as the video conference provider 310. The webinar access information may be received from the first client device in response to the first client device requesting to join a webinar.

At step 710, the first client device may be identified. The first client device may be identified by the video conference provider. The first client device may be identified based on the webinar access information. For example, the webinar access information may include one or more parameters corresponding to a participant of the first client device. In such cases, identifying the first client device based on the webinar access information may include identifying the one or more parameters corresponding to the participant of the first client device. In an example embodiment, the one or more parameters may include at least one of a job title of the participant, an identity of the participant (e.g., name, phone number, email address), an interest in a topic, a contribution of the participant, or a networking interest of the participant. In some embodiments, the webinar access information may include watch-party access information.

In embodiments, the webinar access information may be used to determine a watch-party assignment for the first client device. For example, the one or more parameters in the webinar access information may be used to determine the watch-party assignment for the first client device (e.g., the participant corresponding to the first client device). In an example embodiment, the one or more parameters may be determined based on information received from the first client device. In such an embodiment, the method may include transmitting to the first client device a request for information and responsive to transmitting the request, receive from the first client device the information. The one or more parameters may be determined based on the information received from the first client device and the webinar access information corresponding to the first client device. The watch-party assignment may then be determined based on the one or more parameters. The watch-party access information may be based on the watch-party assignment for the first client device.

At step 715, the watch-party access information may be transmitted to the first client device. For example, the video conference provider may transmit the watch-party access information to the first client device based on the webinar access information. In some embodiments, the watch-party access information may be part of a webinar invitation. In such cases, the method 700 may include automatically joining the first client device to the webinar watch-party when the first client device joins the webinar.

Method 700 may include step 720. At step 720 a first set of audio and video streams and a second set of audio and video streams may be transmitted to the first client device. The first set of audio and video streams may correspond to a webinar main meeting, such as main meeting 365, and the second set of audio and video streams may correspond to a webinar watch-party, such as webinar watch-party 350. The second set of audio and video streams may be transmitted based on the watch-party access information.

At step 725, a first audio stream and a first video stream may be received from the first client device. The first audio and first video stream may be received by the video conference provider. The video conference provider may, in turn, transmit the first audio and first video stream to other participants in the webinar watch-party. The first audio stream and the first video stream may not be transmitted to the participants in the webinar main meeting. Method 700, in some embodiments, may further include displaying, on the first client device, an indication that the first client device is in the webinar watch-party.

In some embodiments, the method 700 may further include receiving, from a second client device, second webinar access information, identifying the second client device based on the second webinar access information, transmitting, to the second client device, second watch-party access information, and transmitting, to the second client device the first set of audio and video streams corresponding to the webinar main meeting and a third set of audio and video streams corresponding to a second webinar watch-party.

Figure 8:
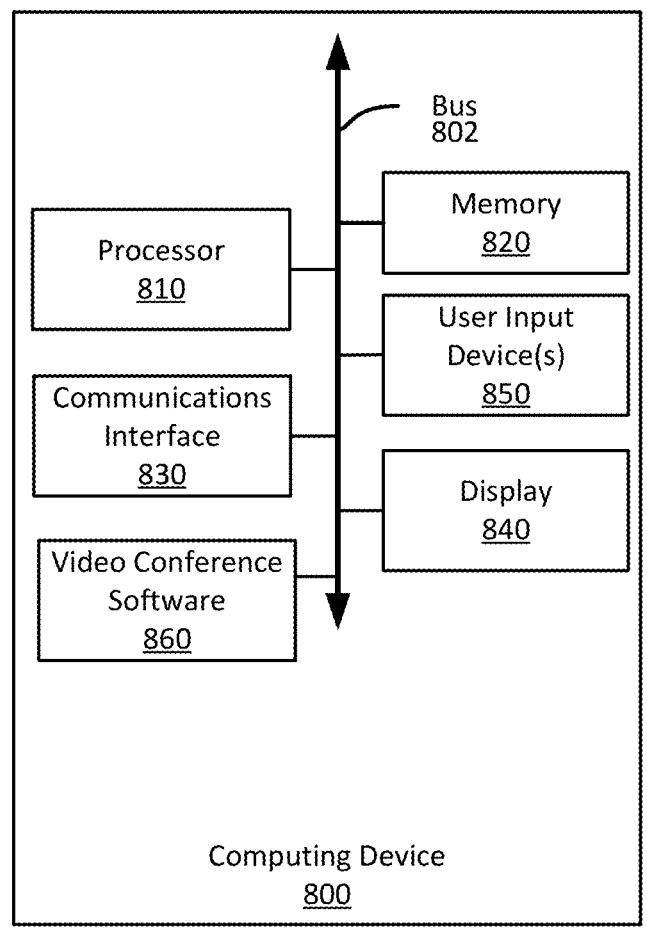
FIG. 8 shows an example computing device suitable for use with any disclosed systems or methods according to this disclosure.

Referring now to FIG. 8, FIG. 8 shows an example computing device 800 suitable for use in example systems or methods for providing a webinar watch-party during a webinar. The example computing device 800 includes a processor 810 which is in communication with the memory 820 and other components of the computing device 800 using one or more communications buses 802. The processor 810 is configured to execute processor-executable instructions stored in the memory 820 to perform one or more methods for providing a webinar watch-party during a webinar, such as part or all of the example method 700, described above with respect to FIG. 7. The computing device, in this example, also includes one or more user input devices 850, such as a keyboard, mouse, touchscreen, video input device (e.g., one or more cameras), microphone, etc., to accept user input. The computing device 800 also includes a display 840 to provide visual output to a user.

The computing device 800 also includes a communications interface 830. In some examples, the communications interface 830 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification As used below, any reference to a series of examples is to be understood as a reference to each of those examples disjunctively (e.g., "Examples 1-4" is to be understood as "Examples 1, 2, 3, or 4").

Example 1 is a system comprising: a non-transitory computer-readable medium; a communications interface; and a processor communicatively coupled to the non-transitory computer-readable medium and the communications interface, the processor configured to execute processor-executable instructions stored in the non-transitory computer-readable medium to: receive, from a first client device, webinar access information; identify the first client device based on the webinar access information; transmit, to the first client device, watch-party access information; transmit to the first client device: a first set of audio and video streams corresponding to a webinar main meeting; and a second set of audio and video streams corresponding to a webinar watch-party based on the watch-party access information; and receive, from the first client device, a first audio stream and a first video stream.

Example 2 is the system of any previous or subsequent Example, wherein the processor is configured to execute further processor-executable instructions stored in the non-transitory computer-readable medium to: determine a watch-party assignment for the first client device based on the webinar access information; and transmitting, to the first client device, the watch-party access information based on the watch-party assignment.

Example 3 is the system of any previous or subsequent Example, wherein the processor is configured to execute further processor-executable instructions stored in the non-transitory computer-readable medium to: identifying, based on the webinar access information, one or more parameters corresponding to a participant of the first client device; and determine the watch-party assignment for the first client device based on the one or more parameters corresponding to the participant of the first client device.

Example 4 is the system of any previous or subsequent Example, wherein the one or more parameters comprise at least one of: a job title of the participant; an identity of the participant; an interest in a topic; a contribution from the participant; or a networking interest of the participant.

Example 5 is the system of any previous or subsequent Example, wherein the processor is configured to execute further processor-executable instructions stored in the non-transitory computer-readable medium to: receive, from a second client device, a request to join the webinar watch-party; and responsive to receiving an acceptance of the request from the second client device to join the webinar watch-party, transmit, to the second client device, the watch-party access information.

Example 6 is the system of any previous or subsequent Example, wherein the processor is configured to execute further processor-executable instructions stored in the non-transitory computer-readable medium to: receive, from the second client device, a second audio stream and a second video stream; transmit to the second client device: the first set of audio and video streams corresponding to the main meeting; and the first audio stream and the first video stream as part of the second set of audio and video streams corresponding to the webinar watch-party; and transmit, to a plurality of client devices in the webinar watch-party, the second audio stream and the second video stream from the second client device.

Example 7 is the system of any previous or subsequent Example, wherein the processor is configured to execute further processor-executable instructions stored in the non-transitory computer-readable medium to: receive, from the first client device, a request to exit the webinar watch-party; and responsive to the request to exit the webinar watch-party, terminate transmission, to the first client device, of the second set of audio and video streams corresponding to the webinar watch-party.

Example 8 is a method comprising: receiving, from a first client device, webinar access information; identifying the first client device based on the webinar access information; transmitting, to the first client device, watch-party access information; transmitting to the first client device: a first set of audio and video streams corresponding to a webinar main meeting; and a second set of audio and video streams corresponding to a webinar watch-party based on the watch-party access information; and receiving, from the first client device, a first audio stream and a first video stream.

Example 9 is the method of any previous or subsequent Example, wherein transmitting, to the first client device, the watch-party access information is based on identifying the first client device using the webinar access information.

Example 10 is the method of any previous or subsequent Example, wherein identifying the first client device using the webinar access information comprises identifying one or more parameters corresponding to a participant of the first client device.

Example 11 is the method of any previous or subsequent Example, wherein the one or more parameters comprise at least one of: a job title of the participant; an identity of the participant; an interest in a topic; a contribution from the participant; or a networking interest of the participant.

Example 12 is the method of any previous or subsequent Example, wherein the watch-party access information is part of a webinar invitation; and the method further comprises: automatically joining the first client device to the webinar watch-party when the first client device joins the webinar.

Example 13 is the method of any previous or subsequent Example, further comprising: displaying, on the first client device, an indication that the first client device is in the webinar watch-party.

Example 14 is the method of any previous or subsequent Example, further comprising: receiving, from a second client device, second webinar access information; identifying the second client device based on the second webinar access information; transmitting, to the second client device, second watch-party access information; and transmitting, to the second client device: the first set of audio and video streams corresponding to the webinar main meeting; and a third set of audio and video streams corresponding to a second webinar watch-party.

Example 15 is a non-transitory computer-readable medium comprising processor-executable instructions configured to cause one or more processors to: receive, from a first client device, webinar access information; identify the first client device based on the webinar access information; transmit, to the first client device, watch-party access information; transmit to the first client device: a first set of audio and video streams corresponding to a webinar main meeting; and a second set of audio and video streams corresponding to a webinar watch-party based on the watch-party access information; and receive, from the first client device, a first audio stream and a first video stream.

Example 16 is the non-transitory computer-readable medium of any previous or subsequent Example, wherein the processor is configured to execute further processor-executable instructions stored in the non-transitory computer-readable medium to: transmit the first audio stream and the first video stream from the first client device as part of the second set of audio and video streams to a plurality of client devices in the webinar watch-party.

Example 17 is the non-transitory computer-readable medium of any previous or subsequent Example, wherein the processor is configured to execute further processor-executable instructions stored in the non-transitory computer-readable medium to: determine a type of watch-party for the webinar watch-party; and terminate transmission, to a plurality of client devices in the main meeting, of the first video stream from the first client device based on the type of watch-party.

Example 18 is the non-transitory computer-readable medium of any previous or subsequent Example, wherein the processor is configured to execute further processor-executable instructions stored in the non-transitory computer-readable medium to: transmit, to the plurality of client devices in the main meeting, a representation of a participant corresponding to the first client device.

Example 19 is the non-transitory computer-readable medium of any previous or subsequent Example, wherein the webinar watch-party is a private watch party.

Example 20 is the non-transitory computer-readable medium of any previous or subsequent Example, wherein the processor is configured to execute further processor-executable instructions stored in the non-transitory computer-readable medium to: transmit, to the first client device, a request for information; responsive to transmitting the request, receive from the first client device the information; determine one or more parameters based on the information and the webinar access information corresponding to the first client device; and determine a watch-party assignment for the first client device based on the one or more parameters.

That which is claimed is:
1. A system comprising:
a non-transitory computer-readable medium;
a communications interface; and
a processor communicatively coupled to the non-transitory computer-readable medium and the communications interface, the processor configured to execute processor-executable instructions stored in the non-transitory computer-readable medium to:
receive webinar access information for a webinar from a first client device associated with a participant of the webinar;

based on the webinar access information, join the first client device to a main meeting of the webinar and provide webinar audio and video streams corresponding to the main meeting to the first client device;

establish a webinar watch-party associated with the webinar; and based on the participant joining the webinar watch-party, adjust a representation of the participant displayed in a roster of the main meeting from a first representation to a second representation.

2. The system of claim 1, wherein the processor is configured to execute further processor-executable instructions stored in the non-transitory computer-readable medium to:

transmitting, to the first client device, watch-party access information to the first client device based on an assignment of the first client device to the webinar watch-party.

3. The system of claim 2, wherein the processor is configured to execute further processor-executable instructions stored in the non-transitory computer-readable medium to:

identify one or more parameters based on the webinar access information; and determine the assignment based on the one or more parameters.

4. The system of claim 3, wherein the one or more parameters comprise any combination of:

a job title of the participant;
an identity of the participant;
an interest in a topic;
a contribution from the participant; or
a networking interest of the participant.

5. The system of claim 1, wherein the processor is configured to execute further processor-executable instructions stored in the non-transitory computer-readable medium to:

establish a plurality of webinar watch-parties associated with the main meeting;

after a second client device joins the main meeting, provide a list of the plurality of webinar watch-parties to the second client device;

after providing the list to the second client device, receive, from the second client device, a request to join the webinar watch-party from among the plurality of webinar watch-parties on the list; and responsive to receiving the request from the second client device to join the webinar watch-party, transmit watch-party access information to the second client device, the watch-part access information being configured to allow the second client device to access the webinar watch-party.

6. The system of claim 1, wherein the processor is configured to execute further processor-executable instructions stored in the non-transitory computer-readable medium to:

receive, from the first client device, a request to exit the webinar watch-party; and responsive to the request to exit the webinar watch-party, terminate providing, to the first client device, audio and video streams associated with the webinar watch-party.

7. The system of claim 1, wherein the processor is configured to execute further processor-executable instructions stored in the non-transitory computer-readable medium to:

provide the first representation of the participant to a plurality of client devices in the main meeting;

determine a type of watch-party for the webinar watch-party; and in response to the participant joining the webinar watch-party, adjust the first representation of the participant in the main meeting to the second representation based on the type of the webinar watch-party.

8. The system of claim 1, wherein the processor is configured to execute further processor-executable instructions stored in the non-transitory computer-readable medium to:

automatically join the first client device to the webinar watch-party when the first client device joins the webinar.

9. A computer-implemented method comprising:

receiving webinar access information for a webinar from a first client device associated with a participant of the webinar;

establishing a webinar watch-party associated with the webinar;

based on the webinar access information, joining the first client device to a main meeting of the webinar and providing webinar audio and video streams corresponding to the main meeting to the first client device; and based on the participant joining the webinar watch-party, adjusting a representation of the participant displayed in a roster of the main meeting from a first representation to a second representation.

10. The method of claim 9, further comprising:

identifying one or more parameters corresponding to the participant based on the webinar access information;

determining an assignment of the participant to the webinar watch-party based on the one or more parameters; and transitioning the first client device to the webinar watch-party based on the assignment.

11. The method of claim 10, wherein a parameter among the one or more parameters comprises:

a job title of the participant;
an interest in a topic;
a contribution from the participant; or
a networking interest of the participant.

12. The method of claim 9, furthering comprising:

automatically joining the first client device to the webinar watch-party when the first client device joins the webinar.

13. The method of claim 9, further comprising:

displaying, on the first client device, an indication that the first client device is in the webinar watch-party.

14. The method of claim 9, wherein the webinar watch-party is a first webinar watch-party, and further comprising:

receiving, from a second client device, second webinar access information;

joining the second client device to the main meeting of the webinar based on the second webinar access information;

establishing a second webinar watch-party;

transitioning the second client device to the second webinar watch-party; and transmitting, to the second client device:

a first set of audio and video streams corresponding to the main meeting of the webinar; and a second set of audio and video streams corresponding to a second webinar watch-party that is different from the first webinar watch-party.

15. The method of claim 9, further comprising:
providing the first representation of the participant to a plurality of client devices in the main meeting;
determining a type of watch-party for the webinar watch-party; and
in response to the participant joining the webinar watch-party, adjusting the first representation of the participant in the main meeting to the second representation based on the type of the webinar watch-party.

16. A non-transitory computer-readable medium comprising processor-executable instructions configured to cause one or more processors to:
receive webinar access information for a webinar from a first client device associated with a participant of the webinar;
based on the webinar access information, join the first client device to a main meeting of the webinar and provide webinar audio and video streams corresponding to the main meeting to the first client device;
establish a webinar watch-party associated with the webinar; and
based on the participant joining the webinar watch-party, adjust a representation of the participant displayed in a roster of the main meeting from a first representation to a second representation.

17. The non-transitory computer-readable medium of claim 16, wherein the one or more processors are configured to execute further processor-executable instructions stored in the non-transitory computer-readable medium to:
provide the first representation of the participant to a plurality of client devices in the main meeting;
determine a type of watch-party for the webinar watch-party; and
in response to the participant joining the webinar watch-party, adjust the first representation of the participant in the main meeting to the second representation based on the type of the webinar watch-party.

18. The non-transitory computer-readable medium of claim 17, wherein the webinar watch-party is a private watch party.

19. The non-transitory computer-readable medium of claim 16, wherein the one or more processors are configured to execute further processor-executable instructions stored in the non-transitory computer-readable medium to:
transmit, to the first client device, a request for information;
responsive to transmitting the request, receive from the first client device the information;
determine one or more parameters based on the information;
determine an assignment of the participant to the webinar watch-party based at least in part on the one or more parameters; and
transition the first client device to the webinar watch-party based on the assignment.

20. The non-transitory computer-readable medium of claim 16, wherein the one or more processors are configured to execute further processor-executable instructions stored in the non-transitory computer-readable medium to:
automatically join the first client device to the webinar watch-party when the first client device joins the webinar.

* * * * *